United States Patent [19]
Reed et al.

[11] Patent Number: 5,903,732
[45] Date of Patent: May 11, 1999

[54] TRUSTED GATEWAY AGENT FOR WEB SERVER PROGRAMS

[75] Inventors: Mark Joseph Reed; David A. Arnovitz; Charles Watt, all of Atlanta; William Reese Jacobs, Deluth, all of Ga.

[73] Assignee: Hewlett-Packard Company, Palo Alto, Calif.

[21] Appl. No.: 08/675,132

[22] Filed: Jul. 3, 1996

[51] Int. Cl.$^6$ .............................. G06F 13/38; G06F 15/17
[52] U.S. Cl. ................ 395/200.59; 395/187.01; 380/49
[58] Field of Search .......... 395/200.55, 200.59, 395/200.47, 200.48, 200.49, 200.33, 200.32, 186, 187.01, 188.01; 340/825.34; 380/25, 49

[56] References Cited

U.S. PATENT DOCUMENTS

| | | | |
|---|---|---|---|
| 4,885,789 | 12/1989 | Burger et al. | 395/200.59 |
| 5,544,322 | 8/1996 | Cheng et al. | 395/200.59 |
| 5,550,984 | 8/1996 | Gelb | 395/187.01 |
| 5,623,601 | 4/1997 | Vu | 395/188.01 |
| 5,678,041 | 10/1997 | Baker et al. | 395/200.59 |
| 5,708,780 | 1/1998 | Levergood et al. | 395/200.59 |
| 5,720,033 | 2/1998 | Deo | 395/187.01 |
| 5,721,908 | 2/1998 | Lagarde et al. | 395/200.32 |
| 5,742,759 | 4/1998 | Nessett et al. | 395/200.59 |

OTHER PUBLICATIONS

Deitel, H M; *An Introduction to Operating Systems*; ISBN 0–201–18038–3; 1990; USA; pp. 400–401, 534–539.

Luotonen, A; "Access Authorization Overview"; Retrieved from Internet at "http;//www.w3.org/pub/WWW/AceessAuthorization/Overview.html"; Dec. 1993; pp. 1–10.

Stempel, S; "IpAccess—An Internet Service Access System for Firewall Installations"; IEEE Comp. Soc.; 1995; pp. 31–41.

Lipshutz, R P; "Microsoft Internet Information Server"; PC Magazine; Apr. 23, 1996; v15 n 8.

Bowen, TS; "OMI's Fast CGI Boosts Web Performance"; InfoWorld; Apr. 15, 1996; v18 n16 p8(1).

EDGE:Work–Group Computing Report; "Internetaccess:NCR Announces Robost Middleware . . . "; Jul. 1, 1996; v7 n320 p20(1).

*Primary Examiner*—Mark H. Rinehart
*Attorney, Agent, or Firm*—Richard F. Schuette

[57] ABSTRACT

The present invention is a secure Web platform (SWP) implementing a mandatory access control policy to enable a plurality of remote users operating Web browsers Internet access to CGI applications in response to HyperText Transfer Protocol (HTTP) requests. The SWP employs a computer having a compartmentalized process and file structure separated in accordance with a mandatory access control policy into an outside compartment comprising a Web server having a root directory chrooted to a directory tree containing only the minimal set of files required to interface the SWP with the Internet, and an inside compartment comprising a plurality of CGI applications having root directories chrooted to a directory separate from the Web server such that the Web server cannot communicate directly with the CGI applications, and a trusted gateway agent for communicating between the Web server and the CGI applications.

21 Claims, 3 Drawing Sheets

TRUSTED GATEWAY AGENT FOR WEB SERVER PROGRAMS

FIELD OF THE INVENTION

The present invention relates to methods and apparatus for providing a secure environment for operating a World Wide Web (WWW) site and, more particularly, to isolating the Web Server from the application or applications that run on the Web site.

BACKGROUND OF THE INVENTION

The Web may be thought of as a global village where computers (hosts) are the buildings, and the world-wide computer network known as the Internet forms the streets. The computers have addresses (IP Addresses)consisting of four numbers separated by periods. Many hosts also have nicknames known as domain names. A Web site typically consists of a UNIX or Microsoft Windows based Web server that "serves" software or content to other computers at the Web site for temporary use. A Web site is not a single application, but a system that provides access to applications and data on the server itself, as well as inside an organization. A user utilizes a Web "browser" to access a Web server to access anything that the organization wants to make available, from general information, to transactions, to access to a customer database.

FIG. 1 illustrates a computer 100 executing a Web browser program 105 that is employed by a user to communicate over the Internet 110, in a special language called Hyper Text Transfer Protocol (HTTP) 115, with another computer 120 executing a Web server program 125 to obtain data. The most basic Web transaction involves the transmission of Webpages, written in HyperText Markup Language (HTML) from the Web server 125 to the Web browser 105. Upon request by the user at the Web browser 105, the Web server 125 translates the HTML-based Webpage into HTTP and sends it over the Internet 110 for display as a Webpage at the requesting browser 105. While Web Server 125 may contain encryption features such as Netscape's Secure Sockets Layer or S-HTTP, and a filtering router 130 may be employed between the Web browser 105 and Web server 125 for filtering out any messages that aren't HTTP Web traffic bound for the SWP, only HTTP 115 communications between Web server 125 and the Web browser 105 are protected.

HTML allows any word(s) on any Webpage to refer ("link") to any other Webpage. While Webpages do a very good job of displaying information in the form of text or images, they do not handle decisions, for example, confirming a correct password and providing for user access or provide more sophisticated functions such as placing an order for goods or services. Thus, a special programming interface known as Common Gateway Interface (CGI) 130 is employed to extend the capabilities of the Web server beyond Webpages alone, allowing a level of interaction that HTML alone cannot provide. A typical organization employs a combination of CGI applications and HTML to provide a desired service or product.

As an example, the banking industry may employ the Internet for on-line banking transactions at a virtual bank. In particular, customers at Web sites on the Internet communicate with a Web server situated outside of the virtual bank which then invokes a plurality of bank related CGI applications within the virtual bank to process requests related to data stored within a database within the virtual bank. For example, one CGI application may be employed for obtaining a balance from a checking account, transferring money from one account to another, or triggering an electronic bill payment. Often the CGI application is a simple front-end to a more sophisticated database server connected to a network internal to the organization (defined as an Intranet).

Netscape's Secure Sockets Layer (SSL) protocol, and/or EIT's Secure HTTP(S-HTTP) may be employed to provide security for HTTP communications between a Web browser and a Web server. SSL and S-HTTP provide encryption, authentication, integrity, and confidentiality of traffic between a client and a server.

Additional Internet security may be obtained through the use of a secure operating system. In particular, HP-UX 10.09.01 Compartmented Mode Workstation (CMW) sold by Hewlett-Packard Company provides an operating system that operates in accordance with a Mandatory Access Control (MAC) policy that governs the way data may be accessed on a trusted system. The MAC policy is a computerized version of the Department of Defense's long-standing multilevel security policy for handling classified information with labels that reflect sensitivity, to maintain those labels or files and processes in the system, and to prevent users not cleared for certain levels of classified information from accessing it. Under MAC, all information on the system is classified to reflect its sensitivity, all users are assigned clearances, and every application runs at a specific sensitivity level. Using the MAC policy, the operating system controls access based on the relative sensitivity of the applications running and the files they access.

Sensitivity labels are associated with every process (an active CGI application manifests itself as a process) and filesystem object, and are used as the primary basis for all MAC policy decisions. A sensitivity label represents the sensitivity of a process or a filesystem object and the data each contains. If an application and the file it attempts to access have compatible sensitivity labels, it can read, write, or possible execute the file. Each new process typically inherits the sensitivity label of its parent. For example, if a program is executed within a shell (for example, sh(1), csh(1), or ksh(1), the new process automatically inherits the sensitivity label of the shell process. New files always inherit the sensitivity label of the process that creates them. Once created, the system provides a special trusted program (the File Manager) that may be employed for changing the sensitivity label of a file. Most users are allowed to upgrade files (to change their sensitivity labels upward, so the new sensitivity label dominates the previous one), but are not allowed to downgrade files (to reduce their sensitivity label so the new label is dominated by the previous label), or to cross grade them (so that the new label is incomparable to the previous one).

The effect of the MAC policy is to rigidly control information flow in the system, from process to file to process, to prevent accidental or intentional mislabeling of sensitive information. To do that, the system compares sensitivity labels to determine if a process can access an object. Any time a process tries to read, write, or execute a file, the system examines the process and object sensitivity labels and consults its MAC rules. For each operation a process requests, the system determines if the process has mandatory read or mandatory write access to the object. Most restrictions that the MAC policy enforces can be summarized by the two following rules:

(1) mandatory read access: A process can read or execute a file, search a directory, or (subject to other privilege requirements) read the contents of other objects if the process's sensitivity label dominates the object's. All of these operations involve transferring data from the object to the process, so having such access is referred to as "mandatory read" access.

(2) mandatory write access: A process can write to a file, remove or create an entry in a directory, or change any object's security attributes (including its sensitivity label), if the process's sensitivity label is the same as the object's. All of these actions involve transferring data from the process to the object, so having such access is called "mandatory write" access. The first rule prevents a user who is not cleared for classified information from seeing it. Rule two prevents a user with a high clearance from revealing information to other users with lower clearances.

There exists a need for a trusted operating system that sets up access controls that grant, person by person, authorization to perform different tasks, from viewing files to making changes in them to changing a computer network's configuration.

It would be desirable and of considerable advantage to provide a mandatory access control policy to segregate the Web server from the CGI application that differs from traditional methods employing a Web server and a firewall.

A bridge between the Web server and the set of CGI applications could be advantageous when implemented by use of a trusted gateway agent to take information from a Web browser's HTTP request to the Web server and make that information available to the appropriate CGI application specified in the HTTP request, especially if the trusted gateway agent works in conjunction with a mandatory access control policy to isolate the Web server and the CGI applications to limit the ability of the Web server to invoke the CGI applications directly.

It will be apparent from the foregoing that there is still a need for a trusted gateway agent that passes arguments or input data to the CGI application and returns data from the CGI application to the Web server.

SUMMARY OF THE INVENTION

The present invention is a secure Web platform (SWP) implementing a mandatory access control policy to enable a plurality of remote users operating Web browsers Internet access to CGI applications in response to HyperText Transfer Protocol (HTTP) requests. The secure Web platform employs a computer having a compartmentalized process and file structure separated in accordance with a mandatory access control policy into an outside compartment comprising a Web server having a root directory chrooted to a directory tree containing only the minimal set of files required to interface the SWP with the Internet, and an inside compartment comprising a plurality of CGI applications having root directories chrooted to a directory separate from the Web server such that the Web server cannot communicate directly with the CGI applications. The SWP further comprises a trusted gateway agent for communicating between the Web server and the CGI applications. The trusted gateway agent comprises a gateway client program running in the outside compartment having a plurality of outside CGI links to the CGI applications, and a gateway server program located in the inside compartment, wherein the outside CGI links are visible to the Web server and upon execution of an outside CGI link, an attempt is made to form a link between the Web server and the gateway server program, and if accepted, the gateway server creates a new process and invokes the corresponding CGI application and connects the HTTP data stream to the CGI application. The CGI application employs the HTTP data stream to communicate through the gateway server and gateway client to the Web browser.

The mandatory access control policy assigns a plurality of sensitivity levels to files within the outside and inside compartments. In particular, a sensitivity label of System Outside is assigned to any files requiring write access by the Web server, and a sensitivity label of System is assigned to any files to which the Web server program needs read-only access, and a sensitivity label of System Inside is assigned to those files that the Web server does not have any access. The CGI applications will run with a SL of System Inside for those requiring write access and a SL of System for those with read-only access.

Other aspects and advantages of the present invention will become apparent from the following detailed description, taken in conjunction with the accompanying drawings, illustrating by way of example the principles of the invention.

DESCRIPTION OF THE PREFERRED EMBODIMENT

The invention provides a secure Web platform (SWP) layered on top of HP UNIX 10.09.01 CMW operating system to implement a mandatory access control policy enabling a plurality of remote users operating Web browsers Internet access to CGI applications in response to HyperText Transfer Protocol (HTTP) requests.

Figure 1:
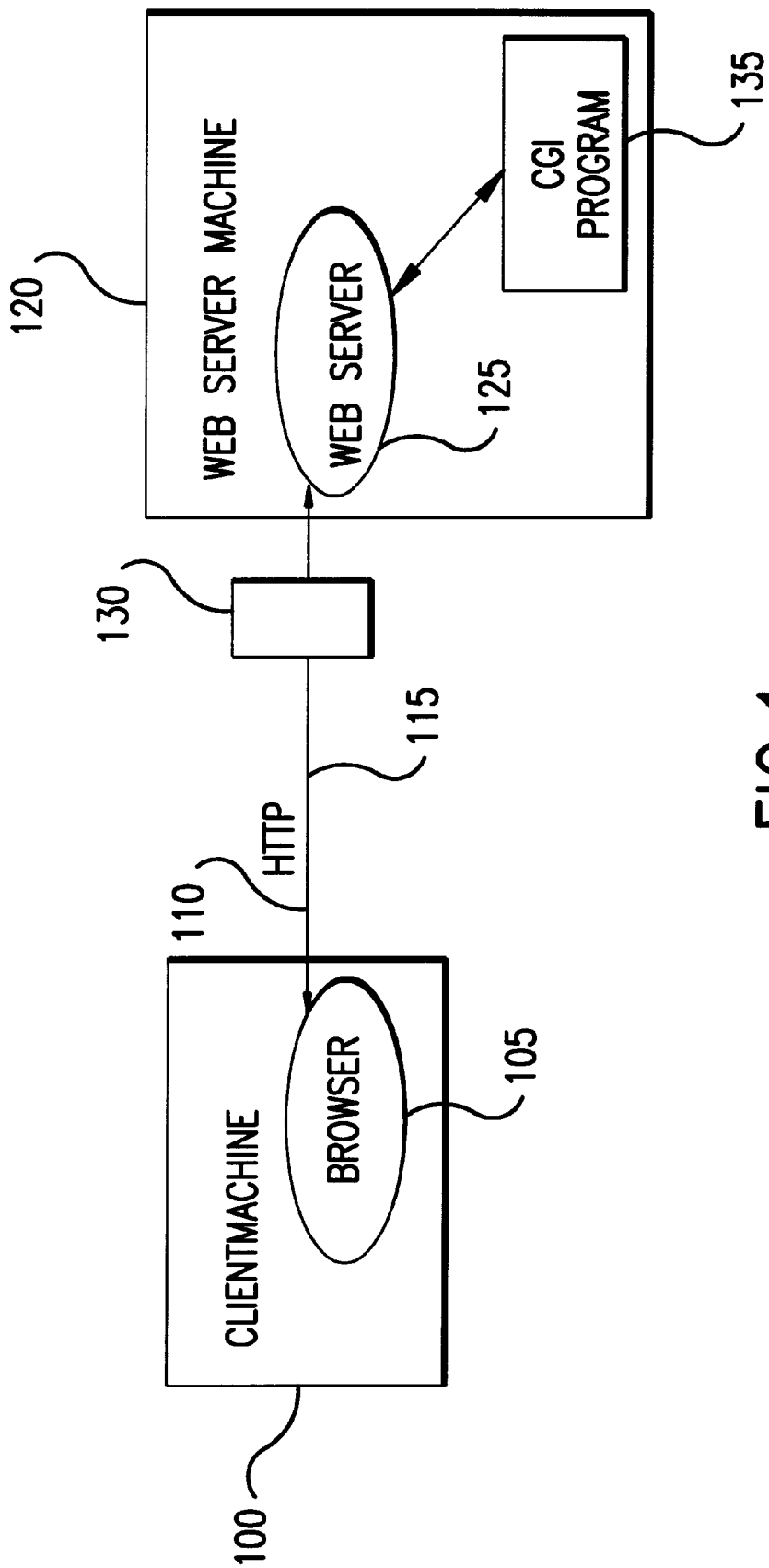
FIG. 1 is a simplified block diagram of a prior art computer executing a Web browser to communicate HTTP with another computer executing a Web server.
Figure 2:
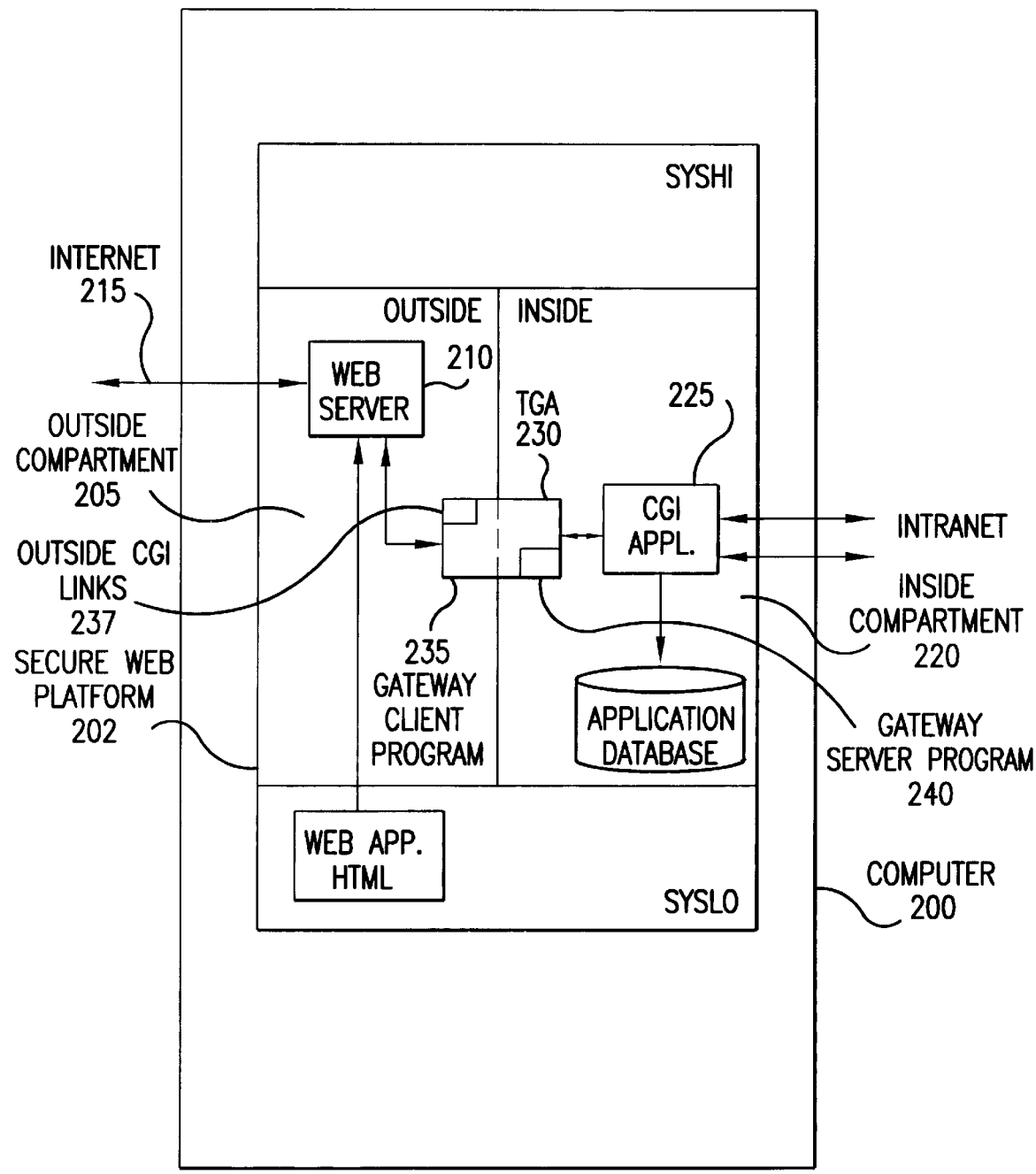
FIG. 2 depicts a simplified schematic of the preferred embodiment of the secure Web platform (SWP).

As illustrated in FIG. 2, an HP UNIX CMW based computer 200 (an HP 9000 Series 700 series workstation) incorporates a layered software secure Web platform 202 having a compartmentalized process and file structure separated in accordance with a mandatory access control policy into an outside compartment 205 comprising a Web server 210 (commercially available from Netscape) having a root directory chrooted to a directory tree containing only the minimal set of files required to interface the SWP 202 with the Internet 215, and an inside compartment 220 comprising a plurality of CGI applications 225 having root directories chrooted, prior to execution, to a directory separate from the Web server 210 such that the Web server 210 cannot communicate directly with the CGI applications 225, as well as minimizing the ability of the CGI applications from accessing portions of the SWP 202 that they do not need. A trusted gateway agent 230 is employed for communicating between the outside and the inside compartments.

All files are labeled INSIDE or OUTSIDE (also, labels of SYSLO or SYSHI are employed in the preferred embodiment but not required to practice the invention), and the mandatory access control policy (as dictated by the underlying HPUX 10.09.01 CMW operating system) keeps them in separate compartments to prohibit communication between them. The mandatory access control policy further comprising a plurality of sensitivity labels (SL), wherein a SL of System Outside is assigned to any SWP files to which the Web server requires write access, a SL of System is assigned to any SWP files to which the Web server program 210 requires read-only access, and a SL of System Inside is assigned for those SWP files to which the Web server does not have any access. All of the programs that run on the Web server 210 are also assigned SL's based on where they are executed. In the default configuration, a program running with a SL of SYSTEM OUTSIDE can't change files having an SL of SYSTEM INSIDE. In the default configuration the compartments have the following relationships: (1) programs can always read and write files that reside at the same SL; (2) programs can never directly write files which have a different SL; (3) programs running at the SYSHI SL can read files in any compartment; (4) programs running in the SYSTEM OUTSIDE SL can only read files in the SYSLO and OUTSIDE compartments; (5) programs running at the SYSTEM INSIDE SL can only read files at the SYSLO and SYSTEM INSIDE SL, and (6) programs running at the SYSLO SL can only read files at the SYSLO SL. Some of the Webpages used by the Web server are stored with a SYSLO SL, while others are kept at the SYSTEM INSIDE SL. This allows very basic information pages (which may not need as much protection) to be accessed more quickly and prevent unauthorized modification. The CGI applications 225 and any databases used by the CGI application are kept at an SL of SYSTEM INSIDE.

Figure 3:
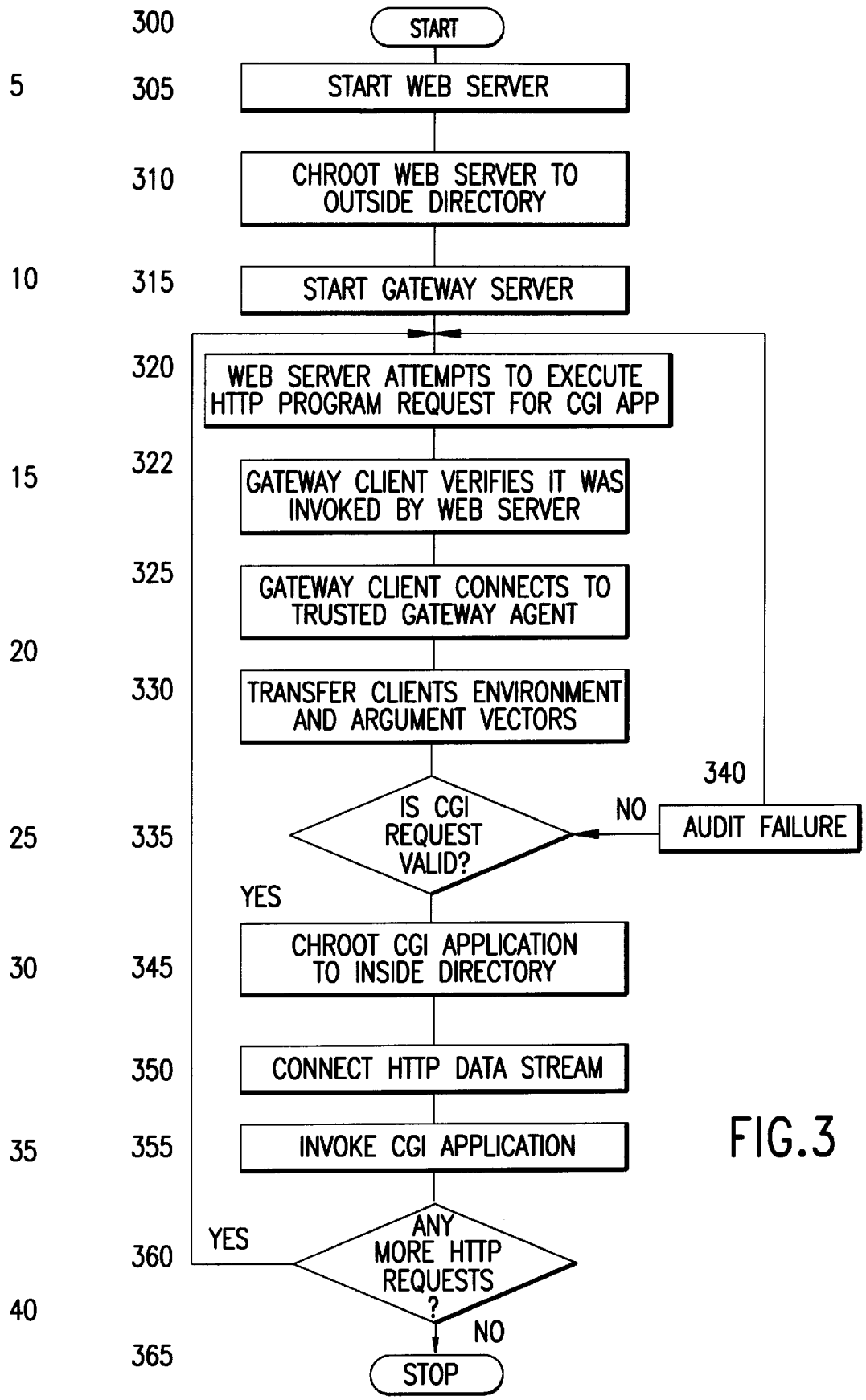
FIG. 3 depicts a flowchart representing the preferred method of the invention.

As depicted in the schematic diagram FIG. 2, the flowchart FIG. 3, and the trusted gateway agent program runs (tga.c and tgad.c attached as Appendix A and B, respectfully), data moves back and forth between a chrooted outside compartment 205 and the separate chrooted inside compartment 220 by invoking the trusted gateway agent 230, a special, security-aware software program that spans the control boundary separating inside and outside compartments. The Web server 210 is restricted from accessing non-essential files by changing the root directory during initialization (Step 305). In particular, the Web server 220 root directory is chrooted such that the files it needs are the only available ones (Step 310). The trusted gateway agent may only be invoked by the Web server 210, and the CGI applications 225 can, in turn, only be invoked by the trusted gateway agent 230. The trusted gateway agent 230 is transparent to both the Web server 210 and the CGI applications 225, both of which can function as if the trusted gateway agent 230 was not present. Notwithstanding, the trusted gateway agent must be able to access both the Web server 210 and the CGI applications 225. The gateway server 240 is initialized directly at system boot time and enabled whenever the Web server 210 is enabled (Step 315). In particular, the gateway server 240 reads its configuration file (a copy of configuration file "tcb/files/tgad.conf" is attached as Appendix B) which specifies the attributes of the trusted gateway agent server 240 process (user ID, group ID, sensitivity label) as well as the set of CGI applications 225 that may be run through the trusted gateway agent 230 and how to run them.

The trusted gateway agent 230 further comprises a gateway client program 235 running in the outside compartment having a plurality of outside CGI links 237 to the CGI applications, and a gateway server program 240 located in the inside compartment 230, wherein the outside CGI links 237 are visible to the Web server 210. All of the outside CGI link 237 directories point to the gateway client 235 and the link name identifies the corresponding CGI application 225 to execute.

Upon receipt of an HTTP request that corresponds to a CGI application, the Web server 210 attempts to execute one of the plurality of outside CGI links 237 identified by the URL of the HTTP request (Step 320). The gateway client 237 verifies that it has been invoked by the Web server 210 and not another application by checking the effective privilege set of its parent process (the Web server 210) for the netprivaddr privilege, as the Web server 210 must be running with the netprivaddr privilege in order to bind to the local HTTP port, whereas, children of the Web server process do not inherit this privilege (a program uses a network port number when communicating) (Step 322). Certain ports are restricted to use by privileged processes only, such ports are only available to programs, like the Web server 210, the gateway client program 237 and the gateway server program 240, that have the netprivaddr privilege).

After the connection request is verified, the gateway client program 237 then makes a connection to the gateway server program 240 (Step 325). The gateway server program 240 verifies that the connection originated from a reserved or a privileged port. The gateway client program's argument vector and environment vector are then transferred to the gateway server 240 (Step 330). The vectors are transmitted as length list structure: first the number of elements in the array is sent (in network byte order), then each element is sent in the form length (again, network byte order), data.

Once the argument and environment vectors are transmitted, the gateway server program 240 consults the trusted gateway agent "configuration file" (see Appendix C "Sample Server Configuration File") to determine if the gateway client program name is a valid request (Step 335), and if so, what program to execute and with what attributes (root directory, user and group identity, sensitivity label). Optionally, the gateway server program may compute the checksum of the CGI application executable file and compare it against a cryptographically strong checksum stored in the configuration file; if the checksums do not match, the request is rejected.

If the request is rejected, the gateway server 240 audits the reason for the failure (Step 340) and transmits an error message to the gateway client 237, which then terminates. If the request is accepted, the gateway server 240 strips the environment of all variables that are not specified by the CGI protocol (see Appendix D, entitled "CGI Environment Variables"), sends a "ready" acknowledgment to the gateway client program 237, redirects its standard input, output and error to the gateway client program connection, and uses the exec(2) system call to replace itself with the target CGI application 225 that is now chrooted to an inside directory (Step 345).

Upon receipt of the "ready" acknowledgment, the gateway client program 237 copies its standard input through the network connection to the CGI application, and copies the output from that connection to its standard output(acting as a "pass-through" filter). Thus, the Web server 210 is writing (through the gateway client and gateway server) to the standard input of the CGI application 225, and reading that application's standard output (Step 350). Since that CGI application 225 has been invoked with the same argument and environment vectors used to invoke the gateway client 237 (which the Web server 210 "thinks" is the real CGI application), the trusted gateway agent 237 is transparent to both the Web server 210 and the CGI application 225. Additional HTTP requests are handled similarly as they are received by the Web server 210 (Step 360).

While the invention has been described and illustrated with reference to specific embodiments employing a UNIX CMW (Compartment Mode Workstation) based operating system running on an HP 9000 Series 700 workstation, those skilled in the art will recognize that modification and variations may be made such that the invention is equally applicable to secure Web platforms based on the Microsoft Windows NT operating system and most compatible hardware. While not disclosed in detail, the Secure Web Platform could also include another Netscape or similarly configured Web server within the inside compartment for interfacing the SWP to an internal Intranet.

APPENDIX A

/tmp/tga.c                                                          1

```c
/*
 * @(#)80  1.11 tga.c, swp_gw_client, swp_dev 1/19/96 05:21:24, SecureWare, Inc.
 *
 * Secure Web Platofrm Trusted Gateway Agent client application.
 *
 * This is run as a CGI program by the HTTP daemon process.  It connects
 * to the TGA server, transmits its argument vector and environment,
 * then connects its standard input and output to the server
 * which runs the actual CGI program.
 */
#if SEC_BASE
#include <sys/secdefines.h>
#include <prot.h>
endif /* SEC_BASE */ include "gateway.h"
include <stdio.h>
#include <stdlib.h>
include <sys/signal.h> void
PipeCleaner()
{
        Warn("Lost connection with server.\n");
        abort();
        exit(1);
} int
main(ArgC, ArgV, EnvP)
int ArgC;
char *ArgV[];
char *EnvP[];
{
    int IPC;                /* file descriptor for connection to server */
    Packet Ack;             /* acknowledgement from server */
    char *Name;             /* pointer to SCRIPT_NAME */
    int Result;             /* our return code */
    priv_t *Missing;        /* used to check privileges */
    char Message[BUFSIZ];   /* place to build an error message */
    char *Msg;              /* used to point to messages */

/*
     * we're the client
     */
     tga_client = 1;
```

/tmp/tga.c                                                          2

```c
    /* set up audit data */
    AudSetAttributes(ArgV[0]);

/*
     * Security initialization
     */
#if SEC_BASE
    set_auth_parameters(ArgC, ArgV);
    initprivs();
#if SEC_MAC
    mand_init();
#endif /* SEC_MAC */

/*
     * drop all privileges
     */
    seteffprivs((priv_t *)0,(priv_t *) 0);

/*
    * and make sure we can raise the ones we'll need later
    */
    if (Missing = checkprivs(privvec(SEC_NETPRIVADDR,
#if SEC_MAC
        SEC_ALLOWMACREAD, SEC_ALLOWMACWRITE, SEC_CVTLABEL,
        SEC_CHSUBJSL,
#endif /* SEC_MAC */
                -1)))
    {
        sprintf(Message,"%s: insufficient privilege: missing %s\n",
                ArgV[0], privstostr(Missing,","));
        AuditFailure(Message);
        Die(Message);
    } endif /* SEC_BASE */

/*
     * We want to pass a full pathname to the server, if possible,
     * for maximum control over the identity of the CGI program
     * that gets executed by the server.  So, if ArgV[0] is not
     * an absolute pathname, replace it with the SERVER_NAME environment
     * variable defined by the CGI specification (which may not be
     * absolute either, but it will not be any worse than the original
     * ArgV[0].
     */
```

/tmp/tga.c                                                      3

```
    if ((ArgV[0][0] != '/') && (Name = getenv("SCRIPT_NAME")))
        ArgV[0] = getenv("SCRIPT_NAME");

#if SEC_MAC
    /*
     * We're executed by the outside HTTPD process, which means we're
     * running at the OUTSIDE sensitivity level.  The server
     * runs at the INSIDE sensitivity level, so in order to communicate with
     * it, we need allowmac.
     */
    if (forceprivs(privvec(SEC_ALLOWMACREAD,SEC_ALLOWMACWRITE,-1),NULL))
    {
        /*
         * The Die() function displays the error message and exits.
         */
        Msg="Insufficient privilege: client could not raise allowmac\n";
        AuditFailure(Msg);
        Die(Msg);
    }
#endif /* SEC_MAC */

/*
     * now connect to the server
     */
    if ((IPC = ConnectToServer()) < 0)
    {
        /* ConnectToServer() is responsible for auditing the failure details */
        Die("Server connection failed");
    }

/*
     * From this point on, the server is responsible for most auditing
     */

/*
     * shut down cleanly if we lose the connection
     */
    signal (SIGPIPE, PipeCleaner);

/*
     * transmit our environment and argument vectors
     */
    if (!SendVector(IPC, EnvP))
    {
        (void) shutdown(IPC, 2);
        Msg  = "Failed to transmit environment vector";
```

/tmp/tga.c 4

```c
            AuditFailure(ErrMessage(Msg));
            Die(Msg);
    }

/*
     * wait for acknowledgement by server
     */
    if (WaitForAck(IPC, &Ack) != GATEWAY_ACK)
    {
        /*
         * if negative acknowledement, read and display error (server
         * will audit the failure)
         */
        if (Ack.Data == GATEWAY_NAK)
        {
                Warn(ReadString(IPC));
                (void)SendAck(IPC);
                shutdown(IPC,2);
                exit(EXIT_FAILURE);
        }
    } if (!SendVector(IPC, ArgV))
    {
        (void) shutdown(IPC, 2);
        Msg  = "Failed to transmit argument vector";
        AuditFailure(ErrMessage(Msg));
        Die(Msg);
    }

/*
     * wait for the server to acknowledge receipt of vectors
     */
    if (WaitForAck(IPC, &Ack) != GATEWAY_ACK)
    {
        /*
         * if negative acknowledement, read and display error (server
         * will audit the failure)
         */
        if (Ack.Data == GATEWAY_NAK)
        {
                Warn(ReadString(IPC));
                (void)SendAck(IPC);
                shutdown(IPC,2);
                exit(EXIT_FAILURE);
        }
    }
```

/tmp/tga.c                                                        5

```c
    /*
     * tell the server to go ahead and run the program ("ACK the ACK")
     */
    if (!SendAck(IPC))
    {
        (void) shutdown(IPC, 2);
        Msg = "Failed to transmit go-ahead to server";
        AuditFailure(Msg);
        Die(Msg);
    }

/*
     * Now we copy data back and forth between standard I/O and the server
     * First, be optimistic about the results:
     */
    Result = EXIT_SUCCESS;

/*
     * Second, get rid of SIGPIPE handler; let Shovel() handle it if the
     * connection disappears
     */
    signal (SIGPIPE, SIG_IGN);

/*
     * Now do the actual "shoveling" of data between stdin/stdout and the
     * socket
     */
    if (Shovel(IPC) != SUCCESS)
    {
        Msg = "Lost connection to server";
        AuditFailure(ErrMessage(Msg));
        Warn(Msg);
        Result = EXIT_FAILURE;
    }

/*
     * Explicitly shut down all connections, just to be safe
     */
    shutdown(IPC, 2);
    shutdown(0, 2);
    shutdown(1, 2);
    shutdown(2, 2);

/*
     * exit
     */
```

/tmp/tga.c 6

```
    return Result;
}
```

APPENDIX B

/tmp/tgad.c                                                        1

```c
/* @(#)83  1.9  tgad.c, swp_gw_server, swp_dev 1/19/96 09:03:24, SecureWare, Inc. */
/* Copyright (C) 1995.  All rights reserved.  */

/*
 * Secure Web Platform Trusted Gateway Agent server
 *
 * Listens for connections on the TGA port.  Accept only
 * those coming from a reserved port on the loopback interface.
 * Spawn a child process to handle each connection.
 *
 * Child takes a request for a CGI program; if valid, it runs that CGI program
 * in an environment determined by the TGA configuration file, with
 * standard input and output connected to the client.
 */ include "server.h"

/*
 *  File descriptor for accepting connections; global so signal handlers
 *  can shut it down if needed
 */
static int Master;

/*
 * main routine - listen for connections and handle them as they
 * arrive
 */
int
main(int ArgC, char *ArgV[])
{
    int Client;         /* file descriptor for connection to single client */
    unsigned short Port; /* port number to which to bind */
#if SEC_BASE
    priv_t *Missing;    /* used to check privileges */
endif /* SEC_BASE */ if SEC_BASE
    /*
     * Security initialization
     */
    set_auth_parameters(ArgC, ArgV);
    initprivs();
#if SEC_MAC
    mand_init();
#endif /* SEC_MAC */

/*
```

`/tmp/tgad.c`                                                                2

```c
     * drop all privileges
     */
    seteffprivs((privvec_t *)0, (privvec_t *) 0);

/*
     * and make sure we can raise the ones we'll need later
     */
    if (!hassavedpriv(SEC_TRUSTED_PROCESS))
    {
        Audit(AUD_ID_STARTUP, AUDIT_RES_FAILED,
        "trustedprocess chain broken");
        Die("Trustedprocess chain broken\n");
    } if (Missing = checkprivs(privvec(SEC_TRUSTED_PROCESS, SEC_FILESYSOPS,
                SEC_NETPRIVADDR, SEC_ALLOWDACWRITE, SEC_CHSUBJLUID,
                SEC_CHSUBJIDENT,
#if SEC_MAC
                SEC_CVTLABEL, SEC_CHSUBJSL, SEC_ALLOWMACREAD, SEC_ALLOWMACWRITE,
#if SEC_ILB
                SEC_NOFLOATSUBJIL, SEC_NOFLOATOBJIL,
#endif /* SEC_ILB */
#endif /* SEC_MAC */
                -1)))
    {
        sprintf(Message,"insufficient privilege: missing %s\n", privstostr(Missing,","));
        Audit(AUD_ID_STARTUP, AUDIT_RES_FAILED, Message);
        Die(Message);
    } endif /* SEC_BASE */

/* set up port */
    Port = GATEWAY_PORT;
    if (ArgC > 1)
        Port = atoi(ArgV[1]);

if ((Master = Listen(Port)) < 0)
    {
        strcpy(Message,"Listen connection failed");
        Audit(AUD_ID_STARTUP, AUDIT_RES_FAILED, Message);
        Die(Message);
    }

/*
     * ``daemonize'' ourselves - detach from controlling terminal
     */
```

/tmp/tgad.c                                                      3

```c
    Daemonize();

/*
     * Log startup
     */
    sprintf(Message,"Startup: listening on port %d\n", Port);
    Log(Message);
    Audit(AUD_ID_STARTUP, AUDIT_RES_SUCCEEDED, Message);

/*
     * catch SIGCLD
     */
    signal(SIGCLD, HandleChildExit);

/*
     * loop forever (or until we get a SIGTERM or unhandled signal
     */
    for (;;)
    {
        if ((Client = Accept(Master)) >= 0)
        {
            Handle(Client, Master);
        }
    }
}

/*
 * Function to handle a new connection.  Fork a new process, log
 * everything, and return.  Child process then runs the Child
 * function to do the actual work of running the CGI program.
 */
int
Handle(FD, Master)
int FD;
int Master;
{
    int ChildPID;              /* fork() return */
    time_t ConnectTime;        /* time connection came in */
    static unsigned int
        ConnectionCount = 0;   /* keep a running count of connections */

/*
     * if we got to this function, we have a connection - bump the
     * count and log it
     */
    ConnectTime = time(0);
    ConnectionCount++;
```

/tmp/tgad.c 4

```c
    sprintf(Message,"got connection %d\n", ConnectionCount);
    Log(Message);

AudInit();
    AudSet(AUD_CONNECT_DATE, &ConnectTime);

/*
     * fork a child process to handle this connection
     */
    if ((ChildPID = fork()) < 0)
    {
        sprintf(Message,"connection %d: fork failed", ConnectionCount);
        AuditFailure(Message);
        return 0;
    }

/*
     * Parent closes the connection to the client and returns
     */
    if (ChildPID)
    {
        close(FD);
        return;
    }

/* -- Child from here on -- */

/*
     * Log startup
     */
    sprintf(Message, "spawned to handle connection %d\n", ConnectionCount);
    Log(Message);

/*
     * If we're debugging, stop so someone can attach a debugger to us
     */
#if DEBUG
    Log("PAUSE - attach debugger and send SIGUSR1\n");
    signal(SIGUSR1, no_op);
    pause();
#endif /* DEBUG */

/*
     * close the master accept() socket
     */
    close(Master);
```

/tmp/tgad.c 5

```c
    /*
     * and run the child process main function
     */
    Child(FD);
}

/*
 * signal handler for SIGCLD.  Log exit status of finsihed child
 */
void
HandleChildExit()
{
    int Pid;                /* Pid of dead child */
    int Status;             /* Status of dead child */
    char Message[BUFSIZ];   /* private buffer used in case we get a signal
                             * while using the common buffer
                             */

/* reap the child */
    Pid = wait(&Status);

/* log its exit status */
    sprintf(Message, "Child %d exited with status %d\n", Pid,
        WEXITSTATUS(Status));
    Log(Message);

/* reinstall the handler for next time */
    signal(SIGCLD, HandleChildExit);
} if DEBUG
/*
 * a no-op handlier solely so we can return from a pause()
 */
void
no_op()
{
}
#endif /* DEBUG */

/*
 * signal handler for SIGTERM - logs event and shuts down cleanly
 */
void
Shutdown(int SigNo)
{
    char Message[BUFSIZ];   /* private buffer used in case we get a signal
                             * while using the common buffer
```

/tmp/tgad.c                                                    6

```c
                                      */

/*
     * if we recognize the signal, log its name; otherwise log the number
     */
    if (SigNo == SIGTERM)
        strcpy(Message,"Caught SIGTERM - shutting down\n");
    else
        sprintf(Message,"Caught signal %d - shutting down\n", SigNo);

Audit(AUD_ID_SHUTDOWN, AUDIT_RES_NULL, Message);
    Log(Message);

/*
     * shutdown the main server socket
     */
    shutdown(Master, 2);

/*
     * and exit
     */
    exit(128+SigNo);
}

/*
 * NAME
 *      OpenLog
 *
 * DESCRIPTION
 *      Open up the log file (if logging is configured) and redirect
 *      standard output and standard error into it
 *
 * PARAMETERS
 *      None
 *
 * RETURN VALUE
 *      None
 */
void
OpenLog(void)
{
    char *FileName;      /* log file name */
    int LogFile;         /* file descriptor */
    privvec_t SavePrivs; /* used for privilege bracketing */ if SEC_BASE
    /*
```

/tmp/tgad.c                                                     7

```
     * we may need privilege to open the file
     */
   if (forceprivs(privvec(SEC_ALLOWDACWRITE,
#if SEC_MAC
                                SEC_ALLOWMACWRITE,
#if SEC_ILB
                                SEC_NOFLOATOBJIL,
#endif /* SEC_ILB */
#endif /* SEC_MAC */
                   -1), SavePrivs) != 0)
    {
         Quit(Master,"could not open log file: insufficient privilege\n",
                 QUIT_AUDIT);
    }
endif /* SEC_BASE */

/*
     * open the log file for append
     */

/* first make sure logging is enabled; disable it by default */
    FileName = "/dev/null";

if (Global && Global->u.server.gw_log)
    {
         if (Global->u.server.gw_log_file)
             FileName = Global->u.server.gw_log_file;
         else
             FileName = GATEWAY_LOG;
    }

LogFile = open(FileName,O_WRONLY|O_APPEND|O_CREAT,0600);

/*
     * now drop the privilegess
     */
    (void) seteffprivs(SavePrivs, NULL);

/*
     * abort if we couldn't open the file
     */
    if (LogFile < 0)
         Quit(Master, "Could not open log file for writing", QUIT_AUDIT);

/*
     * otherwise redirect output and error into it
     */
```

/tmp/tgad.c                                                                8

```c
    if (dup2(LogFile, STDOUT_FILENO) != STDOUT_FILENO)
        Quit(Master, "Could not redirect standard output into log file",
                QUIT_AUDIT);

if (dup2(LogFile, STDERR_FILENO) != STDERR_FILENO)
        Quit(Master,"Could not redirect standard output into log file",
                QUIT_AUDIT);
}

/*
 * standard initialization for a daemon process - detach from controlling
 * terminal, process group, etc.  We use OpenLog to redirect output
 * to a log file, which conveniently detaches us from the terminal
 * (once we close stdin, too).  Once we do all that, we
 * fork and the parent exits, leaving the child to run in the background.
 */
void
Daemonize(void)
{
    pid_t Pid;  /* used to store return value from fork() */

/*
     * close input
     */
    (void) close(STDIN_FILENO);

/* read the configuration file (and redirect output to log file) */
    (void) ReadConf();

/*
     * disassociate from parent process group
     */
    setpgrp();

/*
     * now fork and let the parent exit
     */
    if ((Pid = fork()) < 0)
                Die("fork() failed");

if (Pid)
         exit(EXIT_SUCCESS);

/*
     * shut down cleanly on SIGTERM; ignore most other signals
     */
    signal(SIGTERM, Shutdown);
```

/tmp/tgad.c  9

```
    signal(SIGUSR2,SIG_IGN);
    signal(SIGQUIT,SIG_IGN);
    signal(SIGINT,SIG_IGN);
    signal(SIGHUP, ReadConf);
#ifdef SIGTSTP
    signal(SIGTSTP, SIG_IGN);
    signal(SIGTTIN, SIG_IGN);
    signal(SIGTTOU, SIG_IGN);
#endif

}
```

APPENDIX C

CGI Environment Variables

| Environment Variable | Description |
|---|---|
| AUTH_TYPE | *auth-scheme* value if authentication used |
| CONTENT_LENGTH | size of the attached entity |
| CONTENT_TYPE | Internet Media Type of the attached entity |
| GATEWAY_INTERFACE | CGI specification version |
| HTTP_* | header data read from the client |
| HTTPS | Netscape Commerce Server-specific variable indicating whether or not the Secure Sockets Later (SSL) encryption protocol is active for this network connection. |
| PATH_INFO | resource or sub-resource to be returned by the CGI script |
| PATH_TRANSLATED | OS path to the file that httpd would attempt to access |
| QUERY_STRING | A URL-encoded search string |
| REMOTE_ADDR | IP address of the agent sending the request |
| REMOTE_HOST | fully qualified domain name of the agent sending the request |
| REMOTE_IDENT | identity information reported about the connection |
| REMOTE_USER | user-ID sent by the client |
| REQUEST_METHOD | method with which the request was made |
| SCRIPT_NAME | URI path that could identify the CGI script |
| SERVER_NAME | name for this server |
| SERVER_PORT | port on which this request was received |
| SERVER_PROTOCOL | name and revision of the request's information protocol |
| SERVER_SOFTWARE | name and version of the information server software |

APPENDIX D

[Previous] [Index] [Next]

Sample Server Configuration File

```
# @(#)86  1.8  tgad.conf, swp_gw_server, swp_dev 1/19/96 08:47:02
# Copyright (C) 1995, 1996, SecureWare, Inc.
# All rights reserved.

# Sample configuration file for Trusted Gateway Agent server
# (Send a SIGHUP to running tgad to cause it to reread this file)

# Global configuration information:

#       gw_uid          UID of server process
#       gw_sl           Sensitivity label of server process
#       gw_log          Whether or not logging is enabled
#       gw_log_file     Location of log file

# NOTE: The TGA server's logging mechanism is superfluous if you
# have auditing enabled, but if you wish to enable it, change
# 'gw_log@' to 'gw_log' in the line below.

config:gw_type=server:gw_uid#59:gw_sl=SYSTEM INSIDE:\
        :gw_log@:gw_log_file=/tcb/files/tgad.log:chkent:

# Program environment entries.
# An environment entry specifies the attributes for some set of CGI programs
# (which set is determined later);

#       gw_root         The directory to use as the root for running the
#                         programs (via the chroot(2) system call)
#       gw_dir          The directory (relative to gw_root) in which to look
#                         for the executable files;
#       gw_uid          The user ID with which to run the CGI programs
#       gw_sl           The sensitivity label at which to run the CGI programs
#       gw_access       Accessibility of programs in this environment:
#                         'explicit' indicates that only programs with
#                             explicit entries in this file may be run;
#                         'any' indicates that programs matching wildcard
#                             entries may be run

# Sample environment entry.
# Note that in this example, gw_root is set to '/';
# that means that no chroot(2) is performed, and all the CGI programs in this
# environment have access to the entire filesystem on the host. Also note that
# gw_uid and gw_sl are not set; they default to the attributes of
# the TGA server, as set in the config entry above.

inside:gw_type=environment:gw_root=/:\
        :gw_directory=/swp/inside/app/cgibin:\
        :gw_access=explicit:chkent:

# Program entries.
# A program entry specifies the name of the environment to
# use for a given program, and may also specify these attributes:

#       gw_uid, gw_sl   As above; override the environment setting
#       gw_path         Pathname of file to execute; allows a TGA
#                         client link to have a different name from
#                         the inside CGI program to which it maps
#       gw_allowed      Indicates whether or not the program is
#                         allowed to run; allows specific exclusion of
```

(1)

```
#                       programs that would otherwise be cleared through
#                       a wildcard entry.

# The key field of a program entry must be the full pathname of the program
# as passed via argv[0] when the TGA client is executed by the outside web
# server.  The wildcard form '*/basename' allows a given basename to match in
# any directory, and 'dirname/*' allows an entry to refer to all programs in a
# directory at once.  An entry named '*' is a default for programs not matching
# any other entries.

# NOTE: For purposes of access control, '*/basename' and 'dirname/*' are
# considered 'explicit' entries, while '*' is not.

# Sample (commented out) entry for program 'myprog'.
# This entry indcates that when the TGA client is invoked as program 'myprog'
# and contacts the TGA server, the TGA server will run the program 'altprog' in
# the environment specified by the 'inside' entry:

#*/myprog:gw_type=program:gw_env=inside:gw_allowed:gw_path=altprog:chkent:

# Sample default entry.
# Uncomment this entry to allow any program to run through the gateway (provide
# the proper TGA client exists and the program is in the directory named in the
# 'inside' environment above).

# NOTE: It is more secure to have no default entry, with an explicit entry for
# each program.

#*:gw_type=program:gw_env=inside:gw_allowed:chkent:

# Sample exclusion entry.
# If you use a wildcard entry, you can selectively disallow execution of
# some programs via entries like the one below.  But, as noted above, security
# through inclusion is better than security through exclusion.

#*/badprog:gw_type=program:gw_allowed@:chkent:
```

Last Updated: 2/2/96

[Previous] [Index] [Next]

(2)

What is claimed is:

1. A computer based secure Web platform (SWP) implementing a mandatory access control policy to enable a plurality of remote users operating Web browsers communicating HyperText Transfer Protocol (HTTP) data streams over the Internet access to CGI applications without compromising the security of the SWP, comprising:

a computer having a compartmentalized process and file structure separated in accordance with a mandatory access control policy into an outside compartment containing a Web server implementing HTTP to interface the SWP with the Internet and an inside compartment containing a plurality of CGI applications; and a trusted gateway agent program for communicating between the outside compartment and the inside compartment; the trusted gateway program further comprising a gateway client program located in the outside compartment having a plurality of outside CGI links to CGI applications that are visible to the outside Web server and a gateway server program located in the inside compartment, wherein the outside CGI links are visible to the Web server and upon execution of an outside CGI link, a network link is opened to the gateway server program which invokes the corresponding CGI application, wherein the gateway server program creates a new process and invokes the corresponding CGI application and connects the HTTP data stream between the CGI application and the gateway client, and wherein the CGI application employs the HTTP data stream to communicate through the gateway server program and gateway client program to the Web browser.

2. The computer based secure Web platform as claimed in claim 1, the Web server further comprising the method step of implementing the chroot command to change the root directory of the Web server to a directory tree containing only the minimum set of files required for the Web server to operate.

3. The computer based secure Web platform (SWP) as claimed in claim 2, the mandatory access control policy further comprising a plurality of sensitivity labels, wherein a sensitivity label of System Outside is assigned to any SWP files to which the Web server requires write access, a sensitivity label of System is assigned to any SWP files to which the Web server program requires read-only access, and a sensitivity label of System Inside is assigned for those SWP files to which the Web server does not have any access.

4. The computer based secure Web platform (SWP) as claimed in claim 1, the compartmentalized process and file structure further comprising the step of:

chrooting the CGI applications to run in an inside directory completely separate from the Web server.

5. The computer based secure Web platform (SWP) as claimed in claim 4, the mandatory access control policy further comprising a plurality of sensitivity labels, wherein the CGI applications will run with an SL of System Inside for files requiring write access and an SL of System for those files requiring read-only access.

6. The computer based secure Web platform (SWP) as claimed in claim 4, further comprising a CGI link identifier for each CGI application, and wherein, all of the outside CGI link directories point to the gateway client program and the CGI link identifier identifies the corresponding CGI application to execute.

7. The computer based secure Web platform (SWP) as claimed in claim 1, wherein the Web server executes an outside CGI link identified by the URL of the HTTP request forwarded from the Web browser to establish communication between the gateway client program and the gateway server program, wherein, the gateway server program verifies the validity of the CGI application request, and if verified, the gateway server program invokes the actual CGI application and connects the HTTP data stream such that the inside CGI application may execute.

8. The computer based secure Web platform as claimed in claim 7, the gateway server program being initialized directly at system boot time and enabled whenever the Web server is enabled, wherein the gateway server program listens for Internet protocol connection requests on the trusted gateway agent port specified by /etc/services file on the secure Web platform, and only accepts connections emanating from the same computer host, and only if the communication port of the connection request is in the privileged range.

9. The computer based secure Web platform as claimed in claim 8, the gateway server program further comprising a configuration file (tcb/files/tgad.conf) read upon startup that specifies the attributes of the gateway server program (user ID, group ID, sensitivity label) as well as the set of CGI applications that may be run through the trusted gateway agent.

10. The computer based secure Web platform as claimed in claim 9, further comprising a child process that is created by the gateway server program (via the fork(2) command) for executing the CGI application corresponding to each accepted connection.

11. The computer based secure Web platform as claimed in claim 10, wherein, upon initialization, the gateway server program reads the gateway server configuration file(/tcb/files/tgad.conf) as well as the set of CGI applications that may be invoked by the gateway server program.

12. The computer based secure Web platform as claimed in claim 9, wherein, the Web server invokes the netprivaddr privilege in order to bind to the reserved communication port (80 or 443) for HTTP requests, and wherein the gateway server program also requires netprivaddr privilege to bind to a reserved port, and wherein the gateway client program must have the netprivaddr privilege to initiate a connection on a reserved port which is required by the gateway server program.

13. The computer based secure Web platform as claimed in claim 12, wherein the CGI applications inherit, through the gateway client and the gateway server, the environment variables, command line, and stand I/O file descriptors passed to it by Web server.

14. The computer based secure Web platform as claimed in claim 9, the gateway server checking the cryptographic checksum of the CGI application executable file against a cryptographically strong checksum stored in the configuration file, and if the checksum do not match, the request is rejected.

15. A method for implementing a mandatory access control policy on a computer based secure web platform (SWP) having a compartmentalized process and file structure separated in accordance with a mandatory access control policy enabling a plurality of remote users operating Web browsers communicating HyperText Transfer Protocol (HTTP) data streams over the Internet access to CGI applications without compromising the security of the SWP, comprising the method steps of:

separating the file structure of a computer into an outside compartment containing a Web server implementing HTTP to interface the SWP with the Internet and an inside compartment containing a plurality of CGI applications, and communicating between the outside compartment and the inside compartment with a trusted gateway agent program having a gateway client program located in the outside compartment with a plurality of outside CGI links to CGI applications that are visible to the outside Web server and a gateway server program located in the inside compartment, chrooting the root directory of the Web server to a directory tree containing only the minimum set of files required for the Web server to operate, assigning an a link identifier to the CGI applications such that all of the outside CGI link directories point to the gateway client program and the link identifier identifies the corresponding CGI application to execute, invoking the trusted gateway agent to communicate between the outside compartment and the inside compartment, verifying the validity of the HTTP request from the Web server to execute a CGI application, establishing a connection between the gateway client program and the gateway server program, transferring gateway client program environment and argument vectors to gateway server program, verifying the validity of the CGI request, chrooting the CGI applications to run in an inside directory completely separate from the Web server, invoking the CGI application and connecting the HTTP data stream if the CGI request is valid.

16. The method for implementing a mandatory access control policy on a computer based secure web platform (SWP) as claimed in claim 15, further comprising the step of assigning sensitivity labels in accordance with a mandatory access policy the mandatory access control policy, wherein a sensitivity label of System Outside is assigned to any SWP files to which the Web server requires write access, a sensitivity label of System is assigned to any SWP files to which the Web server program requires read-only access, and a sensitivity label of System Inside is assigned for those SWP files to which the Web server does not have any access.

17. The method for implementing a mandatory access control policy on a computer based secure web platform (SWP) in accordance with claim 15, the step of assigning sensitivity labels further comprises the step of assigning the CGI applications a SL of System Inside for files requiring write access and an SL of System for those files requiring read-only access.

18. The method for implementing a mandatory access control policy on a computer based secure web platform (SWP) in accordance with claim 15, the step of invoking the trusted gateway agent, further comprising the execution of an outside CGI link such that a network link is opened to the gateway server program.

19. The method for implementing a mandatory access control policy on a computer based secure web platform (SWP) in accordance with claim 18, the step of verifying the validity of the HTTP request further comprises the step of checking for the netprivaddr privilege as the such privilege is required to bind to the local HTTP port.

20. The method for implementing a mandatory access control policy on a computer based secure web platform (SWP) in accordance with claim 19, the step of verifying the validity of the CGI request further comprises the step of comparing the trusted gateway agent configuration file to determine if the gateway client program name is a valid request, and if so, what program to execute and with what attributes.

21. The method for implementing a mandatory access control policy on a computer based secure web platform (SWP) in accordance with claim 20, the step of invoking the CGI application and connecting the HTTP data stream further comprising the step of striping the environment of all variables that are not specified by the CGI protocol if the CGI request is valid, which then invokes the corresponding CGI application, and the gateway server program further comprising the step of creating a new process and invoking the corresponding CGI application and connects the HTTP data stream between the CGI application and the gateway client, and wherein the CGI application employs the HTTP data stream to communicate through the gateway server program and gateway client program to the Web browser.

* * * * *